United States Patent [19]
Sato

[11] Patent Number: 5,974,275
[45] Date of Patent: Oct. 26, 1999

[54] QUALITY ASSESSMENT DEVICE

[75] Inventor: Koichi Sato, Tokyo, Japan

[73] Assignee: Asaki Kogaku Kogyo Kabushiki & Dai Nippon Printing Co., Ltd., Tokyo, Japan

[21] Appl. No.: 08/802,877

[22] Filed: Feb. 19, 1997

[30] Foreign Application Priority Data

Feb. 22, 1996 [JP] Japan ................................ 8-060135
Jul. 19, 1996 [JP] Japan ................................ 8-209168

[51] Int. Cl.⁶ ............................................ G03B 19/00
[52] U.S. Cl. ........................................ 396/429; 349/33
[58] Field of Search ........................... 396/30, 429, 439; 349/192, 33, 38

[56] References Cited

U.S. PATENT DOCUMENTS

| | | |
|---|---|---|
| 4,841,322 | 6/1989 | Kawasaki et al. . |
| 4,945,376 | 7/1990 | Kawasaki et al. . |
| 5,315,410 | 5/1994 | Takanshi et al. . |
| 5,408,341 | 4/1995 | Takanashi et al. . |
| 5,424,156 | 6/1995 | Aoki et al. . |
| 5,514,504 | 5/1996 | Iijima et al. . |
| 5,555,205 | 9/1996 | Okabe ................................ 365/108 |
| 5,587,987 | 12/1996 | Okabe ................................ 369/126 |

FOREIGN PATENT DOCUMENTS

| | | |
|---|---|---|
| 0327236 | 8/1989 | European Pat. Off. . |
| 0622954 | 11/1994 | European Pat. Off. . |
| 2-29081 | 1/1990 | Japan . |
| 3-15087 | 1/1991 | Japan . |
| 3-278342 | 12/1991 | Japan . |
| 5-2280 | 1/1993 | Japan . |
| 5-24706 | 4/1993 | Japan . |
| 5-150251 | 6/1993 | Japan . |
| 5-165005 | 6/1993 | Japan . |
| 6-130347 | 5/1994 | Japan . |
| 6-3132872 | 11/1994 | Japan . |
| 6-313894 | 11/1994 | Japan . |
| 7-13132 | 1/1995 | Japan . |

*Primary Examiner*—Safet Metjahic
*Assistant Examiner*—John Chizmas
*Attorney, Agent, or Firm*—Greenblum & Bernstein, P.L.C.

[57] ABSTRACT

A quality assessment device provided in an electro-developing type camera with an electro-developing recording medium, to sense a resistant value of an electrostatic information recording medium provided in an electro-developing recording medium. A dark current sensing resistor is connected in series to the electrostatic information recording medium. A voltage sensing unit is connected in parallel to the dark current sensing resistor to sense a voltage generated therein. When the release switch is turned ON, a switch of a dark current sensing circuit, which includes the dark current sensing resistor and the voltage sensing unit is closed. After a predetermined time has elapsed, the dark current flowing in the dark current sensing resistor is sensed. If the dark current is greater than a threshold value, it is deemed that the electrostatic information recording medium has deteriorated.

16 Claims, 12 Drawing Sheets

FIG. 14

| DARK CURRENT Id | APPLIED VOLTAGE Vap | APPLICATION PERIOD Tap |
|---|---|---|
| $I_0 \sim I_1$ | $V_1$ | $t_1$ |
| $I_1 \sim I_2$ | $V_2$ | $t_2$ |
| $I_2 \sim I_3$ | $V_3$ | $t_3$ |
| $I_3 \sim I_4$ | $V_4$ | $t_4$ |
| $I_4 \sim I_5$ | $V_5$ | $t_5$ |
| $I_5 \sim I_6$ | $V_6$ | $t_6$ |
| $I_6 \sim I_7$ | $V_7$ | $t_7$ |

QUALITY ASSESSMENT DEVICE

BACKGROUND OF THE INVENTION

1. Field of the Invention

The present invention relates to a camera using a recording medium in which an object image obtained through a photographing optical system is electronically developed, and more particularly, to a device for assessing the quality of the recording medium.

2. Description of the Related Art

Conventionally, as disclosed in Japanese Unexamined Patent Publication No. 5-2280 and U.S. Pat. No. 5,424,156, there is known a photographic material which is directly electronically developed so that the developed visible image can be immediately obtained. In this specification, such a recording medium is referred to as an electro-developing recording medium, and an electronic still camera using the electro-developing recording medium is referred to as an electro-developing type camera.

Japanese Unexamined Patent Publication Nos. 5-165005, 6-130347 and 7-13132 disclose an electro-developing recording medium which comprises a liquid crystal display having a memory-type liquid crystal so that an image indicated on the liquid crystal display is kept even if the electric field applied to the liquid crystal display is removed. '347 and '132 disclose an electro-developing recording medium in which the electrostatic information recording medium and the electric charge storage medium are combined to form one body. Namely, in these electro-developing recording mediums, even if an electric voltage applied thereto is removed, the image formed on the electro-developing recording medium is kept.

For recording a clear image on the electro-developing recording medium, the applied electric voltage and the voltage application period on the recording medium are important components (see Japanese Unexamined Patent Publication No. 6-313872). These components depend upon the characteristics, i.e., the resistances and the electrostatic capacities of an electric charge storage medium and an electrostatic information recording medium which are provided in the electro-developing recording medium. Especially, the resistance of the electrostatic information recording medium is greatly affected by the environment such as temperature around the electro-developing recording medium. Namely, by detecting the resistance before the recording operation, the applied electric voltage and the voltage application period on the electro-developing recording medium can be properly controlled.

If the resistance of the electrostatic information recording medium is greatly lowered due to moisture absorption thereof, for example, the difference between an electric current generated in a portion in which the light receiving amount is large and that in a portion in which the light receiving amount is small would become small. Thus, a problem would occur in which a contrast between the bright portion and the dark portion is reduced and a clear image can not be recorded on the electro-developing recording medium.

SUMMARY OF THE INVENTION

Therefore, an object of the present invention is to provide a quality assessment device by which a resistance value of the electrostatic information recording medium is sensed, so that a clear image can always be recorded on the electro-developing recording medium.

According to the present invention, there is provided a quality assessment device for an electro-developing recording medium in which a visible image corresponding to an image formed on an electrostatic information recording medium is electronically developed, the quality assessment device comprising a dark current sensing resistor, and a determining processor.

The dark current sensing resistor is connected to the electrostatic information recording medium in series. The determining processor determines whether the electrostatic information recording medium is deteriorated, based on a first electric voltage generated in the dark current sensing resistor.

Further, according to the present invention, there is provided a quality assessment device for an electro-developing recording medium in which an image is electronically developed, the quality assessment device comprising a dark current sensing resistor, and a determining processor.

The dark current sensing resistor is connected to the electro-developing recording medium. The determining processor determines whether or not the electro-developing recording medium is deteriorated, based on an electric voltage generated in the dark current sensing resistor.

BRIEF DESCRIPTION OF THE DRAWINGS

The objects and advantages of the present invention will be better understood from the following description, with reference to the accompanying drawings in which:

FIG. 14 is a diagram showing a relationship between the electro-developing recording medium and a dark current sensing circuit;

DESCRIPTION OF THE PREFERRED EMBODIMENTS

Figure 1:
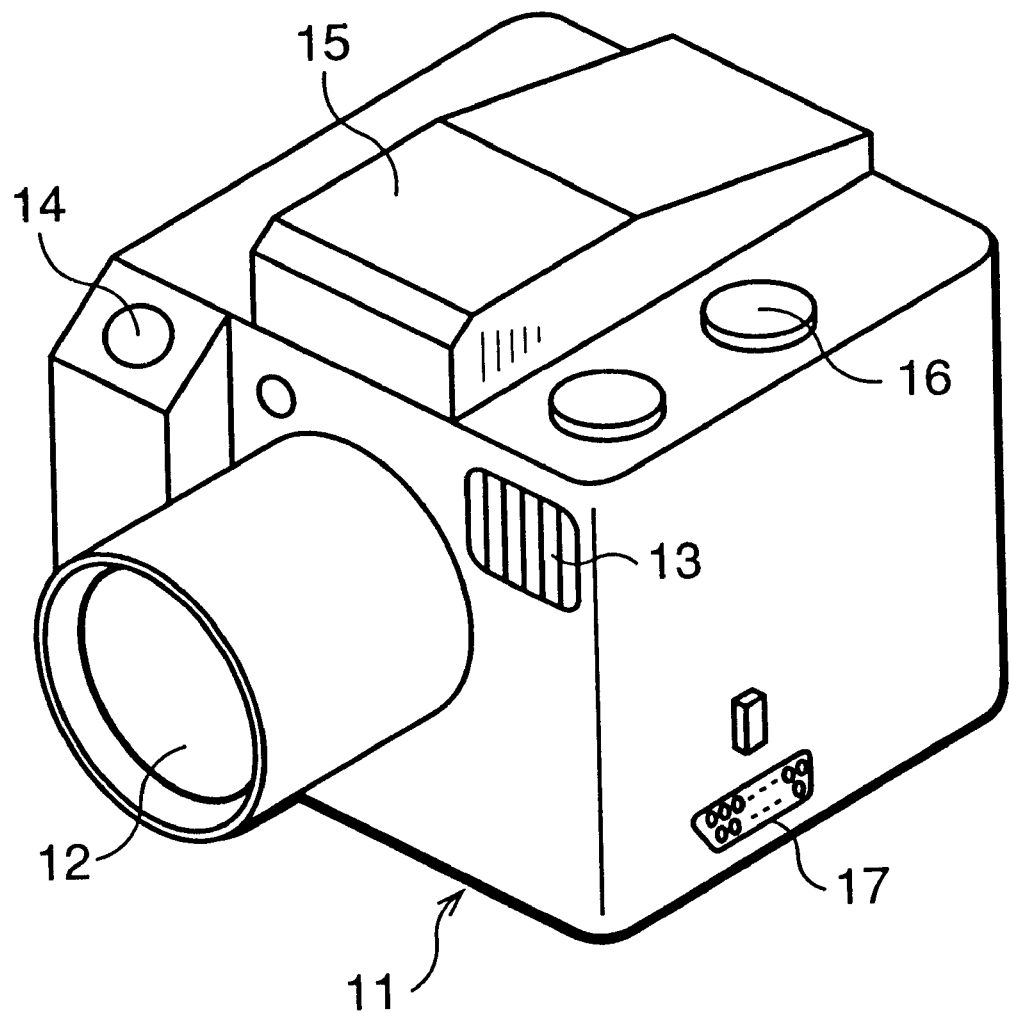
FIG. 1 is an external view showing an electro-developing type camera to which an embodiment of the present invention is applied.

FIG. 1 is an external view of an electro-developing type camera to which an embodiment according to the present invention is applied.

When viewing a camera body 11 from the front side, a photographing optical system 12 including a photographing lens system and so on is provided approximately at the center portion of the front surface of the camera body 11, and an electronic flash 13 is disposed thereon to the right of and above the photographing optical system 12. A release switch 14 is provided on the side opposite to the electronic flash 13.

On the upper surface of the camera body 11, a view finder 15 is provided at the center portion thereof and is extended from the front to the rear end of the camera body 11. A mode select switch 16 is provided on the upper surface and beside the view finder 15. An output terminal 17 is provided on a lower portion of a side surface of the camera body 11, so that an image signal obtained by this camera can be outputted to an external recording device (not shown).

Figure 2:
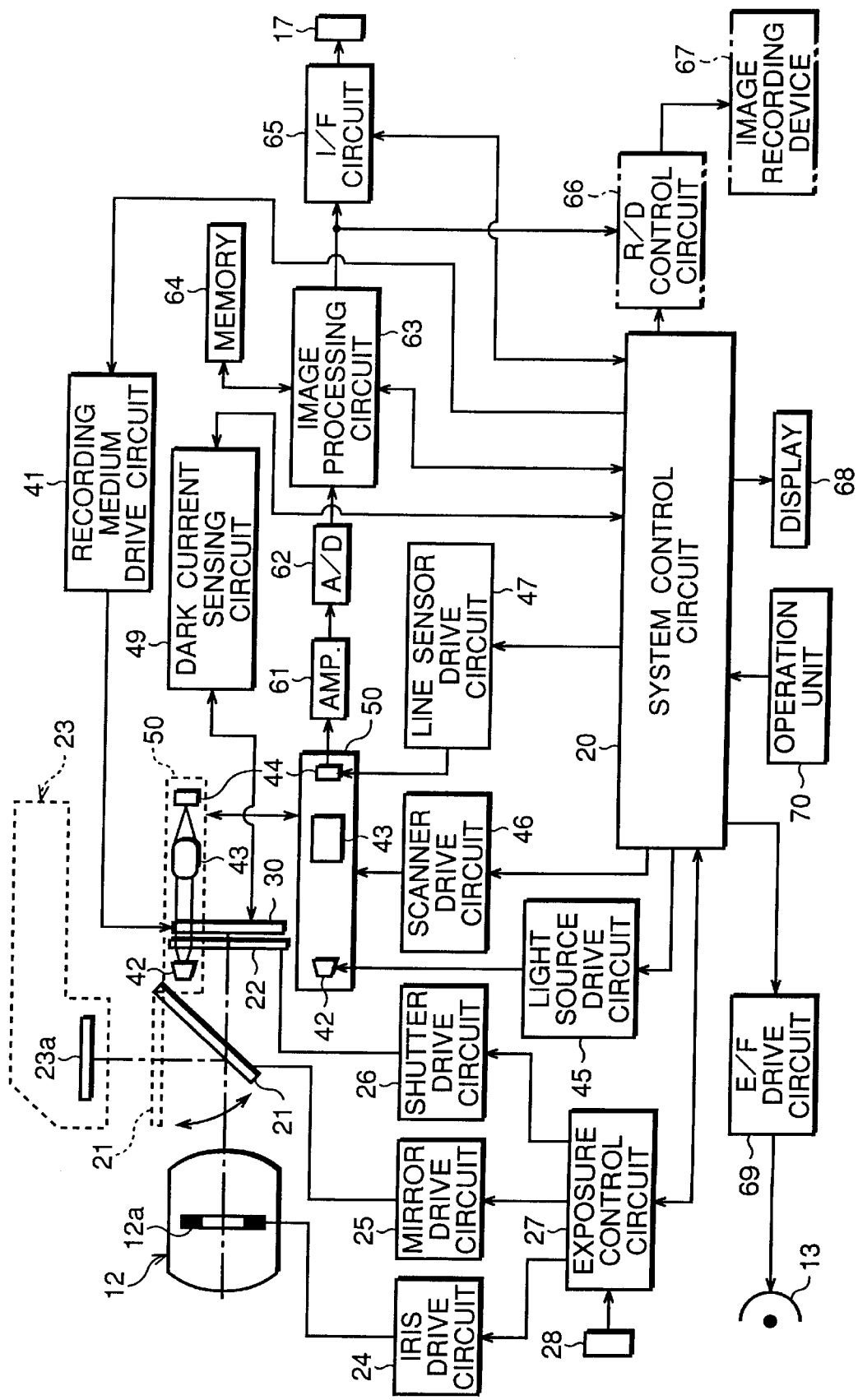
FIG. 2 is a block diagram of the electro-developing type camera shown in FIG. 1.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12a. An electro-developing recording medium 30 is disposed behind the photographing optical system 12. A quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal outputted by the system control circuit 20. Namely, when an exposure is controlled, the degree of opening of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is directed to the view-finder optical system 23 to form an object image on the focusing glass 23a, and thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but upon a photographing operation, the shutter 22 is opened for a predetermined period by the shutter drive circuit 26 under the control of the exposure control circuit 27, and thus, the light beam passing through the photographing optical system 12 enters a light receiving surface of the electro-developing recording medium 30, thus forming a two-dimensional image thereon.

An electric voltage (i.e., a recording medium activating signal) is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A scanning mechanism 50 is provided close to the electro-developing recording medium 30. A light source 42, a scanner optical system 43, and a line sensor 44 are supported by the scanning mechanism 50, and are moved along the electro-developing recording medium 30 by a scanning operation of the scanning mechanism 50.

The light source 42 has a plurality of LED (photodiodes), and can be moved along a front surface of the shutter 22 or the front surface of the electro-developing recording medium 30. The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The line sensor 44 can be moved along the rear surface of the electro-developing recording medium 30, together with the light source 42. The scanner optical system 43 is disposed between the light source 42 and the line sensor 44. When a scanning operation is carried out by the scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44, through an operation of the scanner optical system 43.

ON and OFF control of the light source 42 is performed by a light source drive circuit 45. Control of the reading operation of pixel signals generated in the line sensor 44 is carried out by a line sensor drive circuit 47. Control of the movement of the scanning mechanism 50 is performed by a scanner drive circuit 46. The circuits 45, 46, and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of one frame's worth pixel signals.

The pixel signals read from the memory 64 are inputted to an interface circuit 65 through the image processing circuit 63, so that the pixel signals are subjected to a predetermined process such as a format conversion, and can then be outputted to an external computer (not shown) through the output terminal 17. The pixel signals outputted from the image process circuit 63 are subjected to a predetermined process such as an image compression and a format conversion in a recording device control circuit 66, so that the pixel signals can be recorded on a recording medium such as an IC memory card, for example, in an image recording device 67. The interface circuit 65 and the recording device control circuit 66 are operated in accordance with a command signal outputted from the system control circuit 20.

An operation unit 70 including the release switch 14 and the mode select switch 16 is connected to the system control circuit 20. A photography operation (i.e., a recording operation), in which an image is recorded on the electro-developing recording medium 30 is recorded, and a reading operation, in which the image is read from the electro-developing recording medium 30, are performed by operating the release switch 14 and the mode select switch 16. A display device 68 is connected to the system control circuit 20 to indicate various setting conditions of the electro-developing type camera. Further, an electric flash drive circuit 69 is connected to the system control circuit 20 to control the flash operation of the electronic flash 13.

When a reading of an image from the electro-developing recording medium 30 is not performed, the scanning mechanism 50 is in a position offset from a path between the photographing optical system 12 and the electro-developing recording medium 30; this position being below the electro-developing recording medium 30, for example. When an image recorded on the electro-developing recording medium 30 is read, a scan drive motor included in the scanner drive circuit 46 is rotated, and thus the scanning mechanism 50 is moved upward so that a scan of the line sensor 44 is carried out, and the line sensor 44 is moved in a direction perpendicular to the longitudinal direction of the line sensor 44.

A dark current sensing circuit 49 is provided for determining whether the electro-developing recording medium 30 has deteriorated, and for setting the applied voltage and the voltage application period on the electro-developing recording medium 30 in a recording operation. Namely, when the recording operation is started, a dark current generated in the electro-developing recording medium 30 is detected by the dark current sensing circuit 49 while the shutter 22 is closed, so that the resistant value of the electro-developing recording medium 30 is sensed based on the dark current. Based on the resistance value, the deterioration of the electro-developing recording medium 30 is evaluated to determine the optimum applied voltage and the optimum application period for recording an image on the electro-developing recording medium 30. Determination of the applied voltage and the voltage application period is carried out under the control of the system control circuit 20.

Figure 3:
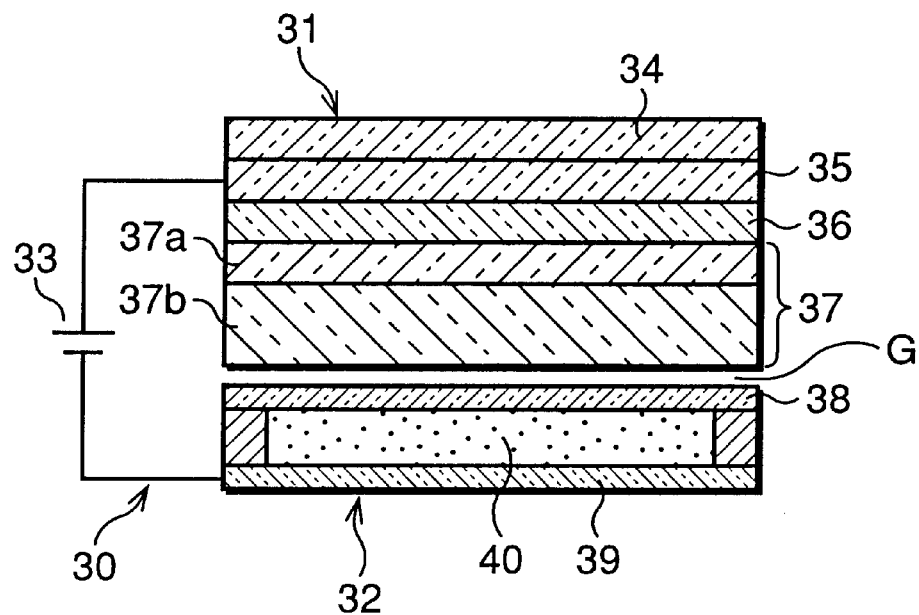
FIG. 3 is a sectional view showing a first example of a structure of an electro-developing recording medium.

FIG. 3 shows a first example of a structure of the electro-developing recording medium 30, and is the same as that shown in Japanese Unexamined Patent Publication No. 5-2280.

The electro-developing recording medium 30 has an electrostatic information recording medium 31 and an electric charge storage medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge storage medium 32 is formed by confining liquid crystal 40, which is a smectic liquid crystal, between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap G therebetween.

An ON-OFF condition of the electric power source 33 is controlled by the recording medium drive circuit 41 (see FIG. 2). When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal 40 is changed in accordance with the electric charge, the image is indicated on the liquid crystal 40 as a visible image, and thus, an image of an object is developed. Namely, the visible image is generated in accordance with the electric charge.

The electric charge storage medium 32 is a liquid crystal display having a memory-type liquid crystal such as a smectic liquid crystal, and thus, the developed visible image is kept therein even if the electric field is removed. In the liquid crystal, the developed visible image can be deleted by heating the liquid crystal, using a heating device (not shown) at a predetermined temperature. In such a case, the same electric charge storage medium 32 can be used repeatedly.

Figure 4:
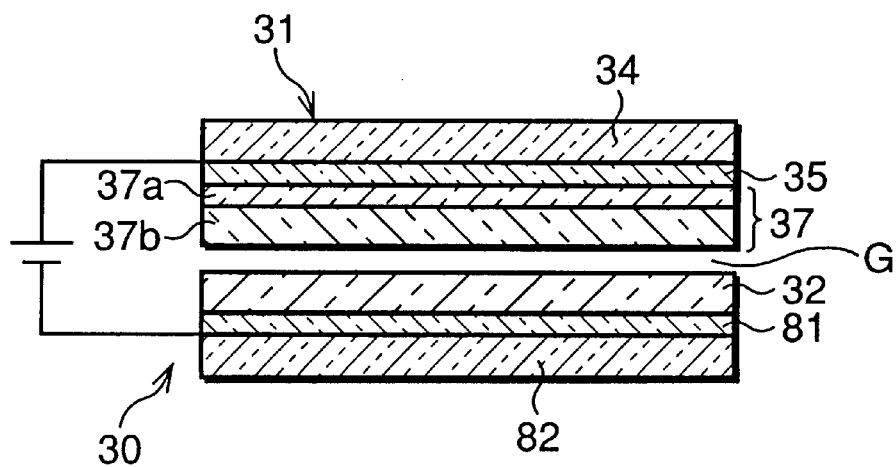
FIG. 4 is a sectional view showing a second example of a structure of the electro-developing recording medium.

FIG. 4 shows a second example of a structure of the electro-developing recording medium 30, and is the same as that shown in Japanese Unexamined Patent Publication No. 5-165005.

The electrostatic information recording medium 31 is formed by laminating the base plate 34, the electrode layer 35 and the photoconducting layer 37, and the photoconducting layer 37 is formed by laminating the electric charge generating layer 37a and the electric charge transferring layer 37b. The electric charge storage medium 32 is a liquid crystal display having a memory-type liquid crystal such as a smectic liquid crystal, and faces the photoconducting layer 37 with a small gap G therebetween. An electrode layer 81 and a base plate 82 are laminated on a surface of the electric charge storage medium 32, which surface is opposite to the electrostatic information recording medium 31. The other structures are the same as those shown in FIG. 3.

Figure 5:
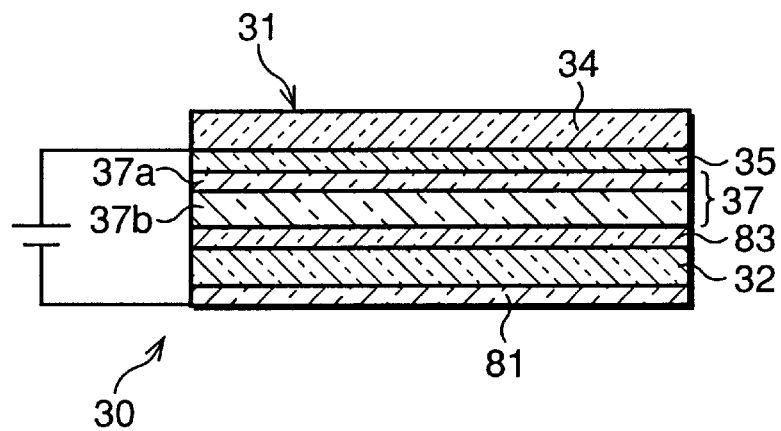
FIG. 5 is a sectional view showing a third example of a structure of the electro-developing recording medium.

FIG. 5 shows a third example of a structure of the electro-developing recording medium 30, and is the same as that shown in Japanese Unexamined Patent Publication Nos. 6-130347 and 7-13132.

This electro-developing recording medium 30 is of a uni-body type. In the electro-developing recording medium 30, an insulating layer 83 is provided between the electric charge transferring layer 37b of the electrostatic information recording medium 31 and the electric charge storage medium 32 which is a liquid crystal display having a memory-type liquid crystal such as a smectic liquid crystal, and an electrode layer 81 is laminated on a surface of the electric charge storage medium 32 which surface is opposite to the electrostatic information recording medium 31. The other structures are the same as those shown in FIG. 4. Namely, no gap is formed between the electrostatic information recording medium 31 and the electric charge storage medium 32.

The electro-developing recording mediums 30 shown in FIGS. 3 through 5 can be used in the still video camera having an electric circuit shown in FIG. 1. The following description assumes that the still video camera is provided with the electro-developing recording medium 30 shown in FIG. 3.

Figure 6:
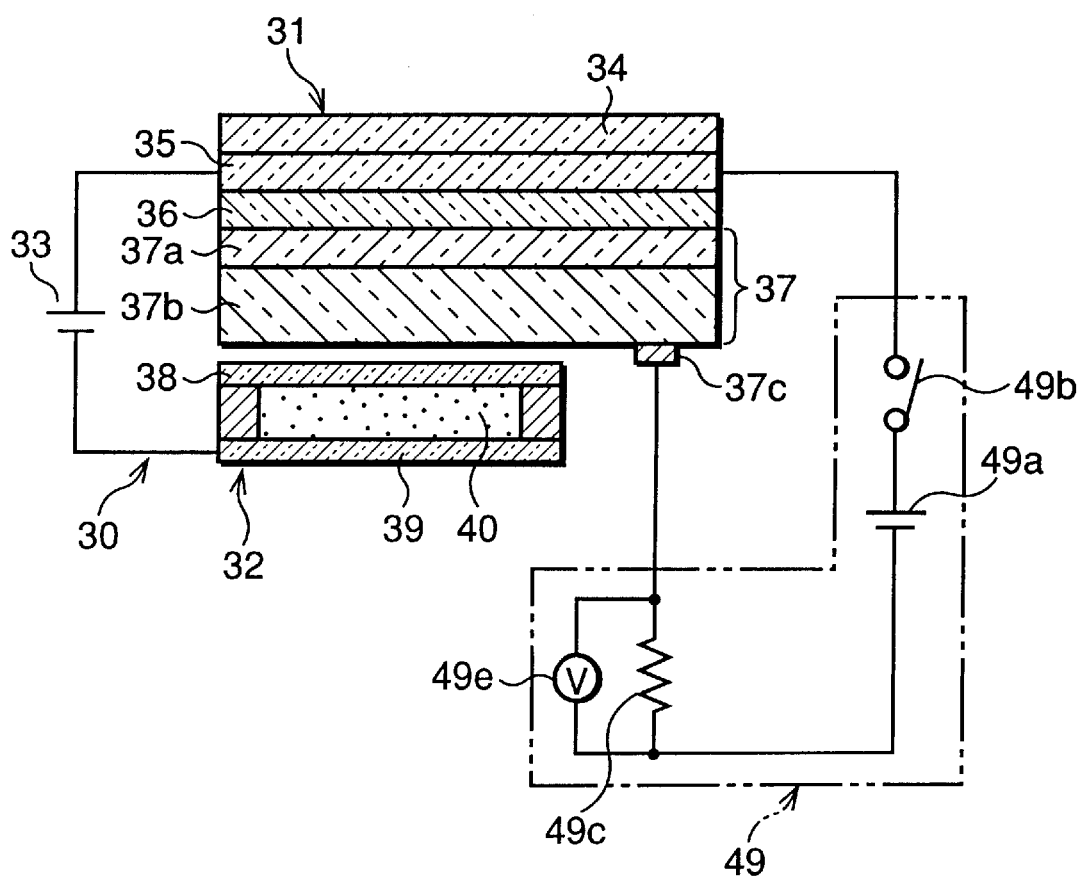
FIG. 6 is a diagram showing a first example of a circuit of the electro-developing recording medium and a dark current sensing circuit.

FIG. 6 is a diagram showing a first example of a circuit in which the dark current sensing circuit 49 is connected to the electro-developing recording medium 30 shown in FIG. 3.

The dark current sensing circuit 49 has a power source 49a, a switch 49b, a dark current sensing resistor 49c, and a voltage detecting unit 49e. The switch 49b is connected between the electrode layer 35 and the positive electrode of the power source 49a in series. One end of the dark current sensing resistor 49c is connected to an electrode 37c attached on the electric charge transferring layer 37b, and the other end of the dark current sensing resistor 49c is connected to the negative electrode of the power source 49a. Namely, the dark current sensing resistor 49c is provided between the electric charge transferring layer 37b and the power source 49a in series. The voltage detecting unit 49e detects a voltage generated in the dark current sensing circuit 49c, and is connected to the dark current sensing resistor 49c in parallel. While the switch 49b is closed, an electric voltage outputted by the power source 49a is applied to the electrostatic information recording medium 31 and the dark current sensing circuit 49c. At this time, the voltage generated in the dark current sensing circuit 49c is detected by the voltage detecting unit 49e. Based on the voltage, the dark current flowing in the electrostatic information recording medium 31 is detected, and the resistant value of the electrostatic information recording medium 31 is obtained.

Figure 7:
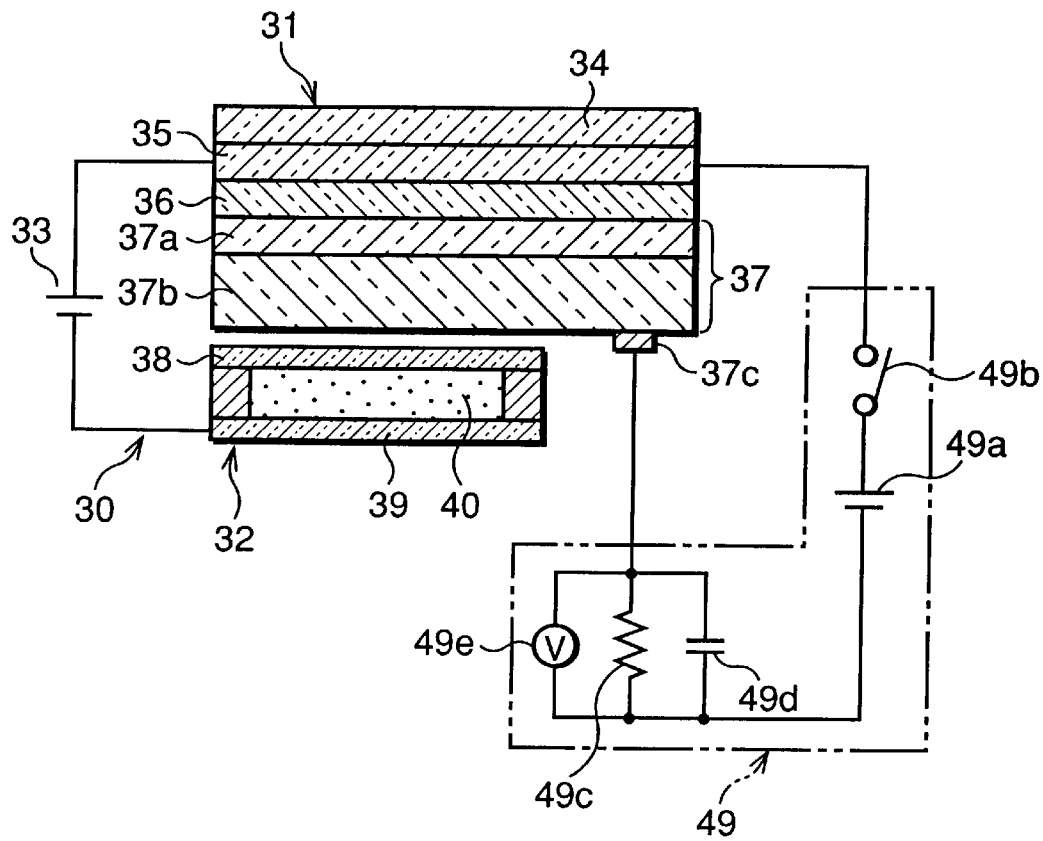
FIG. 7 is a diagram showing a second example of a circuit of the electro-developing recording medium and the dark current sensing circuit.

FIG. 7 is a diagram showing a second example of a circuit in which the dark current sensing circuit 49 is connected to the electro-developing recording medium 30 shown in FIG. 3.

In this example, a capacitor 49d is connected to the dark current sensing resistor 49c in parallel. Thus, while the switch 49b is closed, an electric voltage outputted by the power source 49a is applied to the electrostatic information recording medium 31, the dark current sensing resistor 49c, and the capacitor 49d. Based on the voltage generated in the dark current sensing resistor 49c, the dark current flowing in the electrostatic information recording medium 31 is detected, so that the resistant value of the electrostatic information recording medium 31 is obtained. It should be noted that the time constant of the voltage generated in the dark current sensing resistor 49c is different from that of the construction shown in FIG. 6.

Figure 9:
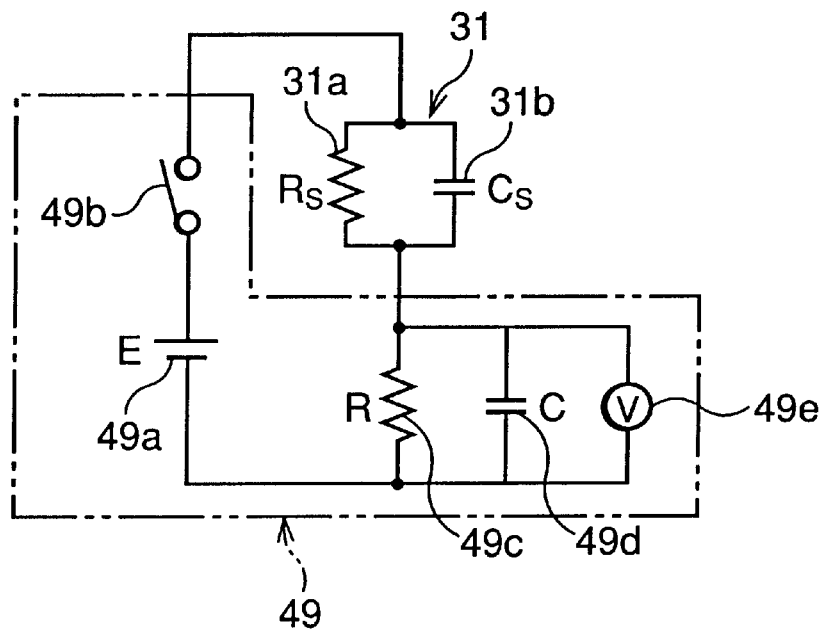
FIG. 9 is a diagram showing an equivalent circuit of the electro-developing recording medium, which is shown in FIG. 7, and the dark current sensing circuit.
Figure 10:
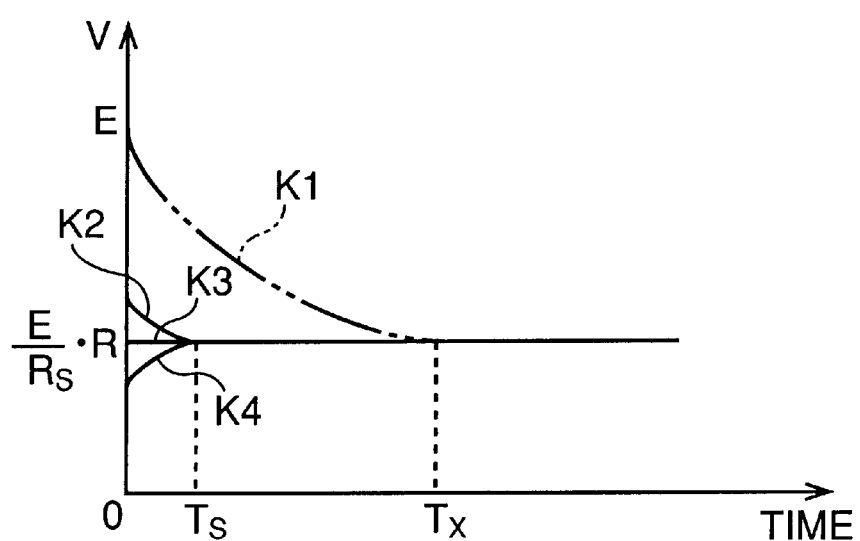
FIG. 10 is a graph showing a time change of a voltage generated in the dark current sensing resistor.

The characteristics of the dark current sensing circuits 49 shown in FIGS. 6 and 7 will be described below with reference to FIGS. 8, 9, and 10.

Figure 8:
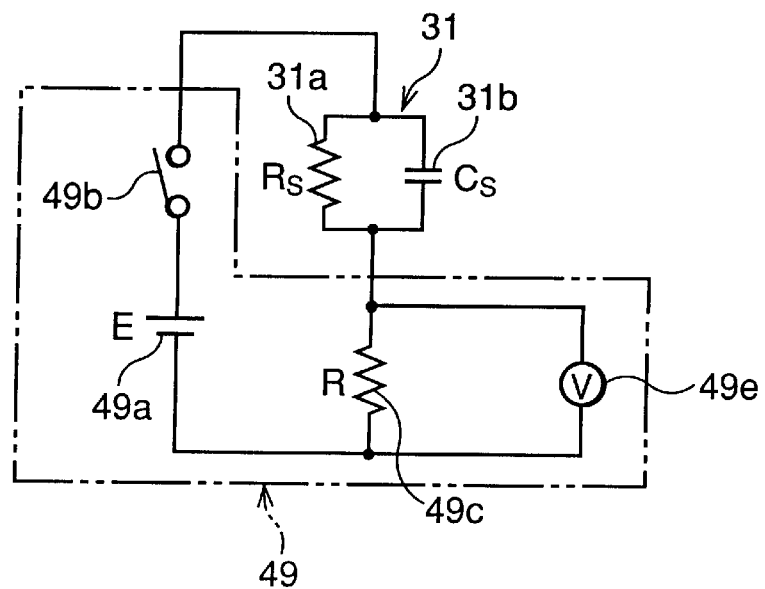
FIG. 8 is a diagram showing an equivalent circuit of the electro-developing recording medium, which is shown in FIG. 6, and the dark current sensing circuit.

FIG. 8 shows a equivalent circuit of the electrostatic information recording medium 31, which is shown in FIG. 6, and the dark current sensing circuit 49. FIG. 9 shows a equivalent circuit of the electrostatic information recording medium 31, which is shown in FIG. 7, and the dark current sensing circuit 49. As shown in these drawings, the electrostatic information recording medium 31 is equivalent to a circuit in which a resistor 31a is connected to a capacitor 31b in parallel. FIG. 10 shows the time change of the voltage V generated in the dark current sensing resistor 49c.

An operation of the circuit shown in FIG. 6 will be described.

When the switch 49b is closed from the open state while the electrostatic information recording medium 31 is shut from light, i.e., while the shutter 22 is closed, a step voltage is applied to the electrostatic information recording medium 31 and the dark current sensing circuit 49. Hence, in the initial stage of the voltage application, the impedance of capacitor 31b is small, and thus, most of the current flows in the capacitor 31b. Namely, there is little voltage drop in the electrostatic information recording medium 31, and thus, a voltage E which has approximately the same value as that of the power source 49a is generated in the dark current sensing resistor 49c, as shown by the double-dashed chain line K1 in FIG. 10.

Since the capacitor 31b charges as time elapses (passes), an electric current starts to flow in the resistor 31a and the electric current value is lowered. Thus, the voltage generated in the dark current sensing resistor 49c is lowered. A certain amount of time, Tx, for example, a few 10 ms is needed until the voltage becomes constant. Then, a voltage, obtained by dividing the voltage by the resistors 31b and 49c (=(E/Rs)× R), is generated in the resistor 49c.

Conversely, according to the circuit shown in FIG. 7, a settling time, i.e., a length of time required for the voltage generated in the dark current sensing resistor 49c to become constant, can be shortened.

Namely, in this circuit, for setting (making) the settling time as short as possible, capacitor 49d having a capacity corresponding to the resistance value of the dark current sensing resistor 49c is provided. In this circuit, immediately after the switch 49b is closed, since the voltage E of the power source 49a is divided by the capacitors 31b and 49d, the voltage V generated in the dark current sensing resistor 49c is:

$$V = (Cs/(Cs+C)) \times E \quad (t=0_+) \tag{1}$$

wherein Cs is the electrostatic capacity of the capacitor 31b, and C is the electrostatic capacity of the capacitor 49d. When a significantly long time elapses after the switch 49b is closed, the voltage E is divided by the resistors 31a and 49c. Accordingly, the voltage V generated in the dark current sensing resistor 49c becomes:

$$V = (R/(Rs+R)) \times E \quad (t=\infty) \tag{2}$$

wherein Rs is the resistance value of the resistor 31b, and R is the resistance value of the resistor 49c.

For setting the time constant of the voltage change of the dark current sensing resistor 49c to substantially 0, the voltage at time $t=0_+$ needs to be equal to the voltage at time $t=\infty$. Namely, by setting formula (1) equal to formula (2), the following can be said:

$$(Cs/(Cs+C)) = (R/(Rs+R)) \tag{3}$$

$$\therefore Cs \times Rs = C \times R$$

The right side of formula (3) shows a first time constant which is determined in accordance with the dark current sensing resistor 49c and the capacitor 49d. The left side of formula (3) is a second time constant of the electrostatic information recording medium 31.

Namely, when the capacitor 49d, which makes the first and second time constants have the same value, is connected in parallel to the dark current sensing resistor 49c, the time required to settle the voltage of the dark current sensing resistor 49c after closing the switch 49b, i.e., the length of time before the resistant value of the electrostatic information recording medium 31 can be sensed, is minimized. Note that, in FIG. 10, references K2, K3, and K4 indicate the cases of R×C=Rs×Cs−|δ|, R×C=Rs×Cs, and R×C=Rs×Cs+|δ|, respectively. Namely, even if there is an error δ between R×C and Rs×Cs, the voltage generated in the dark current sensing resistor 49c reaches a constant at time Ts.

Figure 11:
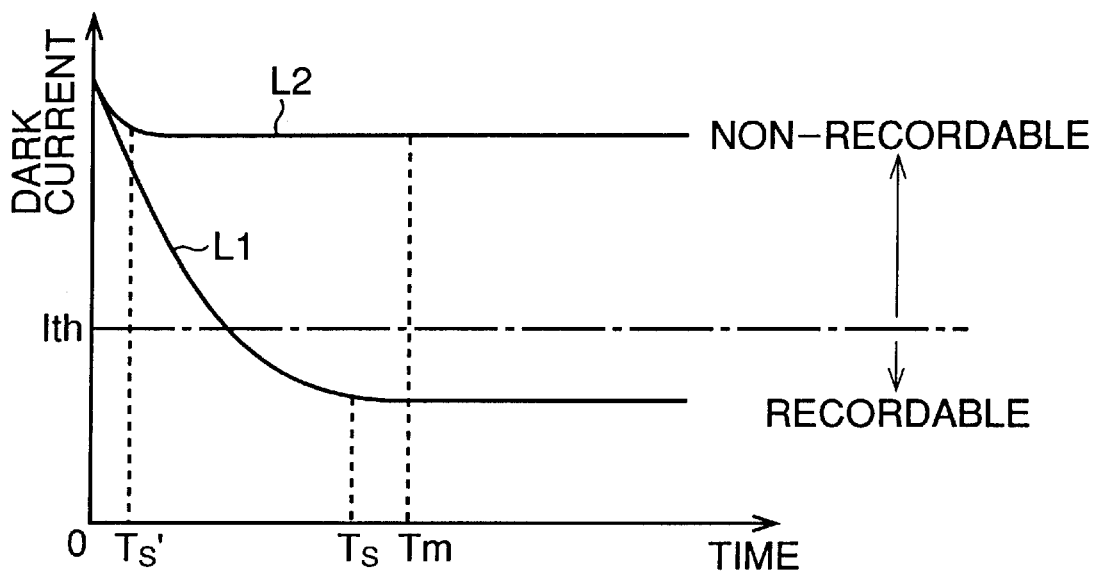
FIG. 11 is a view showing a time change of a voltage generated in the dark current sensing resistor of the dark current sensing circuit shown in FIG. 6.

FIG. 11 shows a transient response of the dark current in the dark current sensing circuit 49 shown in FIG. 6.

When the switch 49b is closed at time 0, first, the dark current flowing in the dark current sensing circuit 49c is far greater than the threshold value $I_{th}$, greatly decreasing with time. If the electrostatic information recording medium 31 has not deteriorated, the length of time for the dark current to decrease is relatively long, as shown by the solid line L1. Thus, the rate of change of the dark current becomes almost 0 at time Ts. Conversely, if the electrostatic information recording medium 31 has deteriorated, as shown by the solid line L2, the length of time for the dark current to decrease is relatively short, and the rate of change of the dark current becomes almost 0 immediately after time 0, i.e., time T's. Then, the dark current does not change substantially.

When the dark current is lower than the threshold value $I_{th}$, the difference between electric currents generated in a portion that receives a large amount of light and a portion that receives a small amount of light, is relatively large in the electrostatic information recording medium, since the resistance value of the electrostatic information recording medium 31 is large. Thus, an image having a high contrast can be recorded in the electric charge storage medium 32. Therefore, it is understood that, if the dark current is less than the threshold value $I_{th}$ after time Ts has elapsed (at time Tm, for example), the electrostatic information recording medium 31 is normal, and a clear image can be recorded therein.

Conversely, when the dark current is higher than the threshold value $I_{th}$, the difference between electric currents generated in a portion that receives a large amount of light and a portion that receives a small amount of light, is relatively small, since the resistant value of the electrostatic information recording medium 31 is small. Thus, an image having a high contrast cannot be recorded. Therefore, it is understood that, if the dark current is greater than the threshold value $I_{th}$ after time Ts has elapsed (at time Tm, for example), the electrostatic information recording medium 31 has deteriorated. Thus, a clear image cannot be recorded therein.

Figure 12:
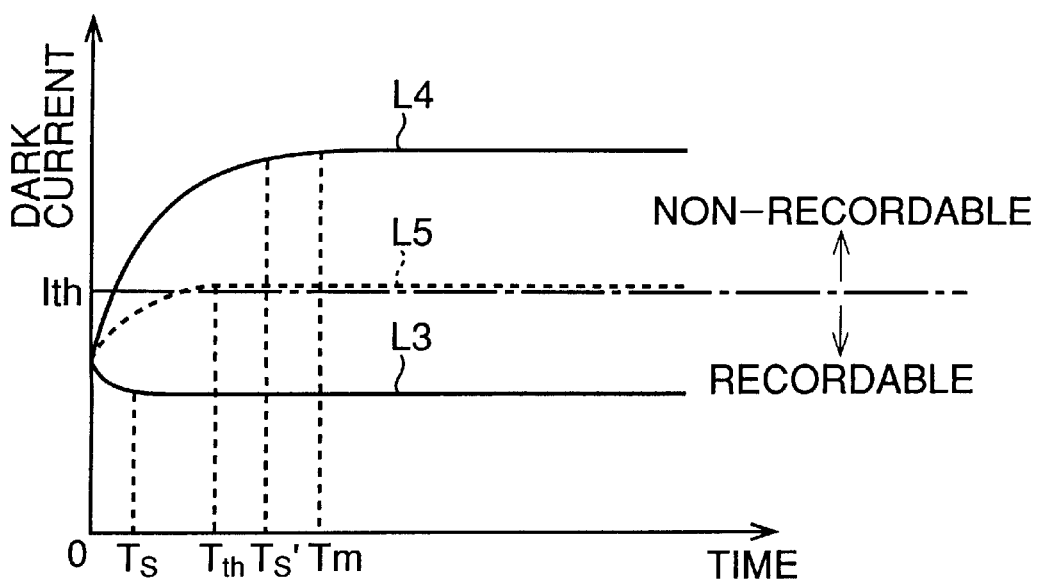
FIG. 12 is a view showing a time change of a voltage generated in the dark current sensing resistor of the dark current sensing circuit shown in FIG. 7.

FIG. 12 shows a transient response of the dark current in the dark current sensing circuit 49 shown in FIG. 7.

In this circuit 49, the dark current flowing in the dark current sensing circuit 49c is less than the threshold value $I_{th}$, when the switch 49b is closed at time 0. Showing an example in which the electrostatic information recording medium 31 has not deteriorated, as shown by the solid line L3, the dark current is decreased from time 0, and the decrease is stopped in a relatively short time. Then, the rate of change of the dark current becomes almost 0 at time Ts, and the amount of the dark current is settled below the threshold value $I_{th}$. Conversely, the electrostatic information recording medium 31 deteriorates, as shown by the solid line L4, the dark current is abruptly increased, and the rate of change of the dark current becomes almost 0 at time T's which is beyond time Ts'. Thus, the dark current is settled above the threshold value $I_{th}$.

When the dark current is lower than the threshold value $I_{th}$, an image having a high contrast can be recorded in the electric charge storage medium 32, as described above. Therefore, it is understood that if the electrostatic information recording medium 31 has not deteriorated, the dark current is less than the threshold value $I_{th}$ when time Ts has elapsed and the dark current has settled, so that a clear image can be recorded therein. Conversely, it is understood that if the electrostatic information recording medium 31 has deteriorated, a clear image would not be able to be recorded since the dark current becomes higher than the threshold value $I_{th}$ after a certain length of time has elapsed. Note that, in FIG. 12, the broken line L5 shows a case immediately after the electrostatic information recording medium 31 has deteriorated to some extent and cannot be used any more. Namely, the rate of change of the dark current becomes approximately 0 at time $T_{th}$ between times Ts and Ts', and then the amount of the dark current is approximately equal to the threshold value $I_{th}$.

Figure 13A:
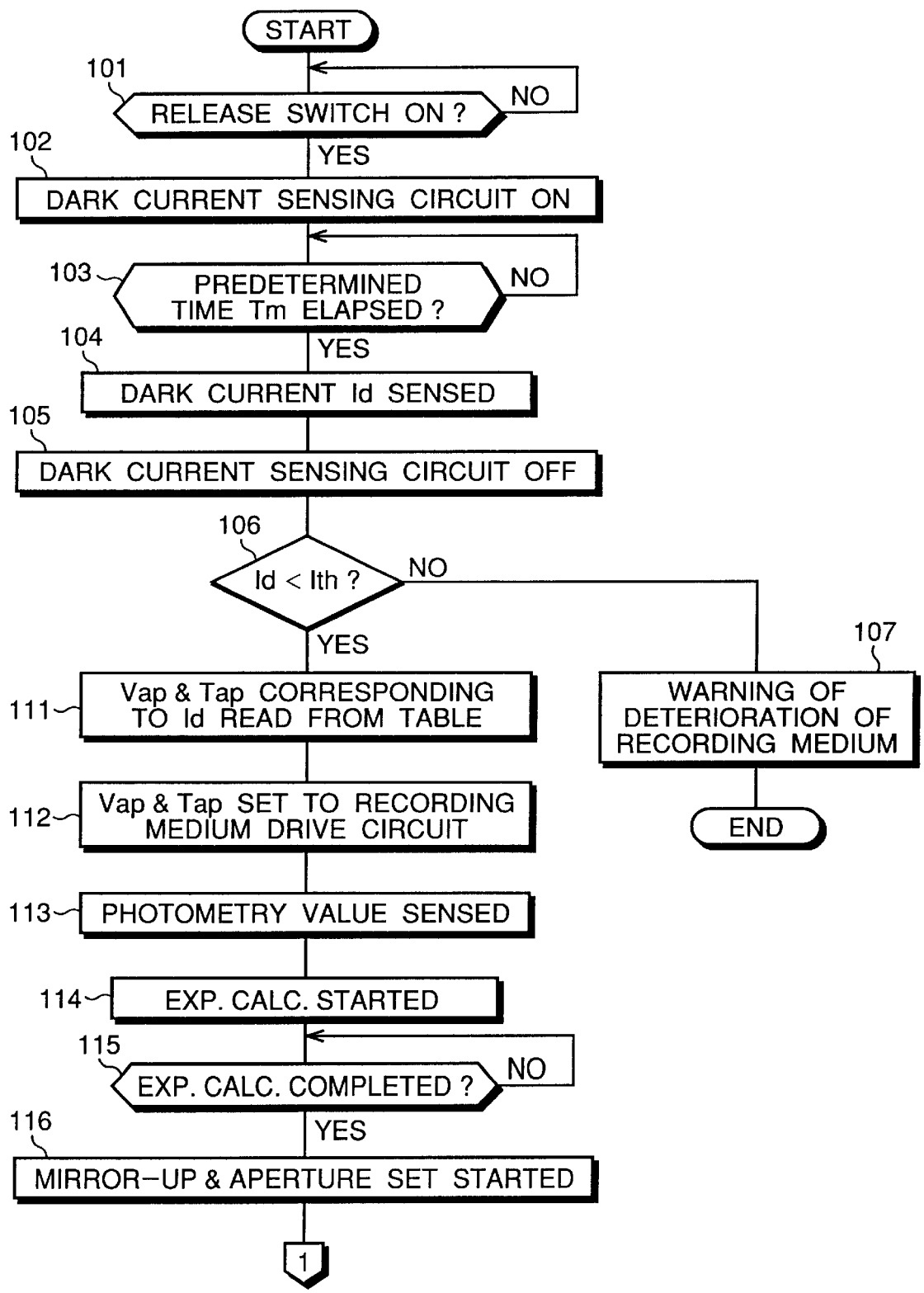
FIGS. 13A and 13B are flow charts of a first example of a program for a recording operation in which an image is recorded on the electro-developing recording medium.
Figure 13B:
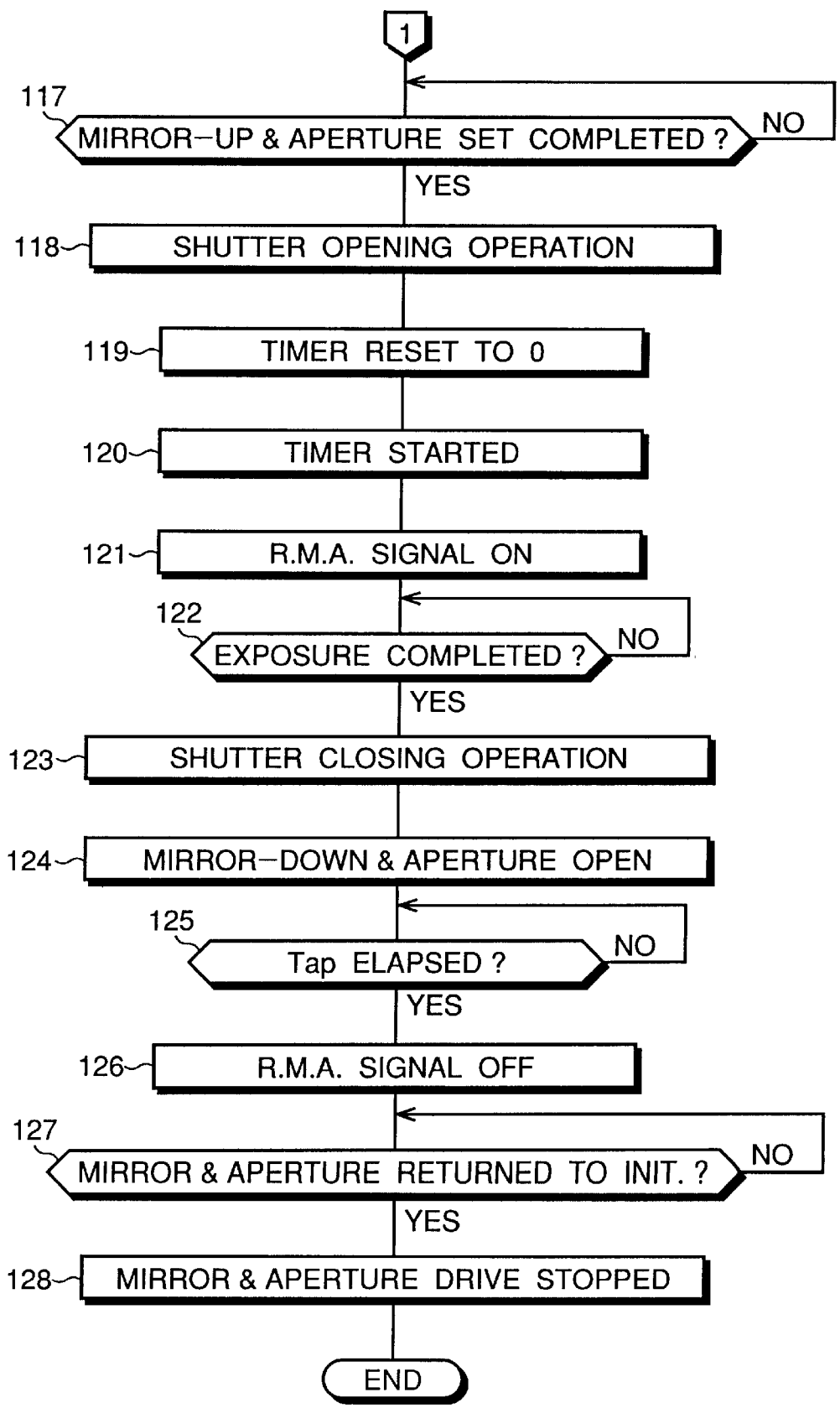

FIGS. 13A and 13B are flow charts of a first example of a program for a recording operation (i.e., a photographing operation) in which an image is recorded on the electro-developing recording medium 30. The first example can be applied to the dark current sensing circuit 49 shown in FIGS. 6 and 7.

When it is sensed in Step 101 that the release switch 14 has been depressed, switch 49c of the dark current sensing circuit 49 is closed in Step 102, so that the dark current sensing circuit 49 is turned ON. In Step 103, it is determined whether a predetermined time Tm has elapsed since the switch 49c is closed. The predetermined time Tm is longer than the settling time Ts (see FIGS. 10 through 12) of the dark current sensing circuit 49. When the predetermined time Tm has elapsed, the process goes to Step 104, in which the dark current value Id flowing in the electrostatic information recording medium 31 is sensed based on the voltage generated in the dark current sensing resistor 49c. In Step 105, the switch 49b opens and the dark current sensing circuit 49 is turned OFF.

In Step 106, it is determined whether the dark current Id is less than the threshold value $I_{th}$. When the dark current Id is not less than the threshold value $I_{th}$, the process goes to Step 107, in which a warning indicating that the electro-developing recording medium 30 has deteriorated is displayed by the display 68 (FIG. 2), and this program ends. Namely, in this case, the recording operation of the electro-developing recording medium 30 is prohibited.

Conversely, when it is determined in Step 106 that the dark current Id is less than the threshold value $I_{th}$, the electro-developing recording medium 30 is deemed to be normal, and Step 111 and the remaining steps are executed. In Step 111, data of the optimum applied voltage Vap and the optimum application period Tap are read from a table stored in a memory included in the system control circuit 20, based on the dark current value Id. An example of the table is shown in FIG. 14, in which the applied voltage Vap and the application period Tap are set to a predetermined range of the dark current values Id. The applied voltage Vap and application period Tap have values such that an image having the highest contrast can be obtained, and are set according to an experiment, for example. In Step 112, the applied voltage Vap and the application period Tap read in Step 106 are set to a memory included in the recording medium drive circuit 41.

In step 113, an output signal from the photometry sensor 28, i.e., a photometry value, is sensed. Then, in Step 114, an exposure calculation is initiated based on the photometry value. When the completion of the exposure calculation is confirmed in Step 115, the recording operation is performed in Step 116 and the remaining Steps in accordance with the calculation result.

In Step 116, the degree of opening of the aperture 12a is adjusted from the fully open state to a predetermined degree of opening, and the quick return mirror 21 is changed from the down position to the up position. Upon confirmation in Step 117 that the quick return mirror 21 has been changed to the up position and the adjustment of degree of opening the aperture 12a has been completed, the shutter 22 is opened in Step 118. Then, the value of the timer is reset to 0 in Step 119, and the timer is started in Step 120.

A recording medium activating signal is outputted in Step 121, so that an electric voltage Vap read in Step 111 is applied to the electro-developing recording medium 30. When the exposure time obtained based on the exposure calculation has elapsed and it is confirmed in Step 122 that the exposure has been completed, the shutter 22 is closed in Step 123. With the completion of the closing operation of the shutter 22, Step 124 is executed so that a rotation of the mirror 21 to the down position is started and a return to a fully open state of the aperture 12a is started. When it is confirmed in Step 125 that the application period Tap read in Step 111 has elapsed, the output of the recording medium activating signal is stopped in Step 126.

Thus, the recording medium activating signal is continuously outputted at least while the shutter 22 is open, and during this period, a predetermined voltage is applied to the electro-developing recording medium 30. By exposing the electro-developing recording medium 30 under this condition, the object image is developed on the electro-developing recording medium 30 as a visible image, which is held on the electro-developing recording medium 30 even after the output of the recording medium activating signal is stopped.

When it is confirmed in Step 127 that the mirror 21 and the aperture 12a have returned to the initial conditions thereof, respectively, the operations of the mirror 21 and the aperture 12a are stopped in Step 128, and thus, this program ends.

Figure 15:
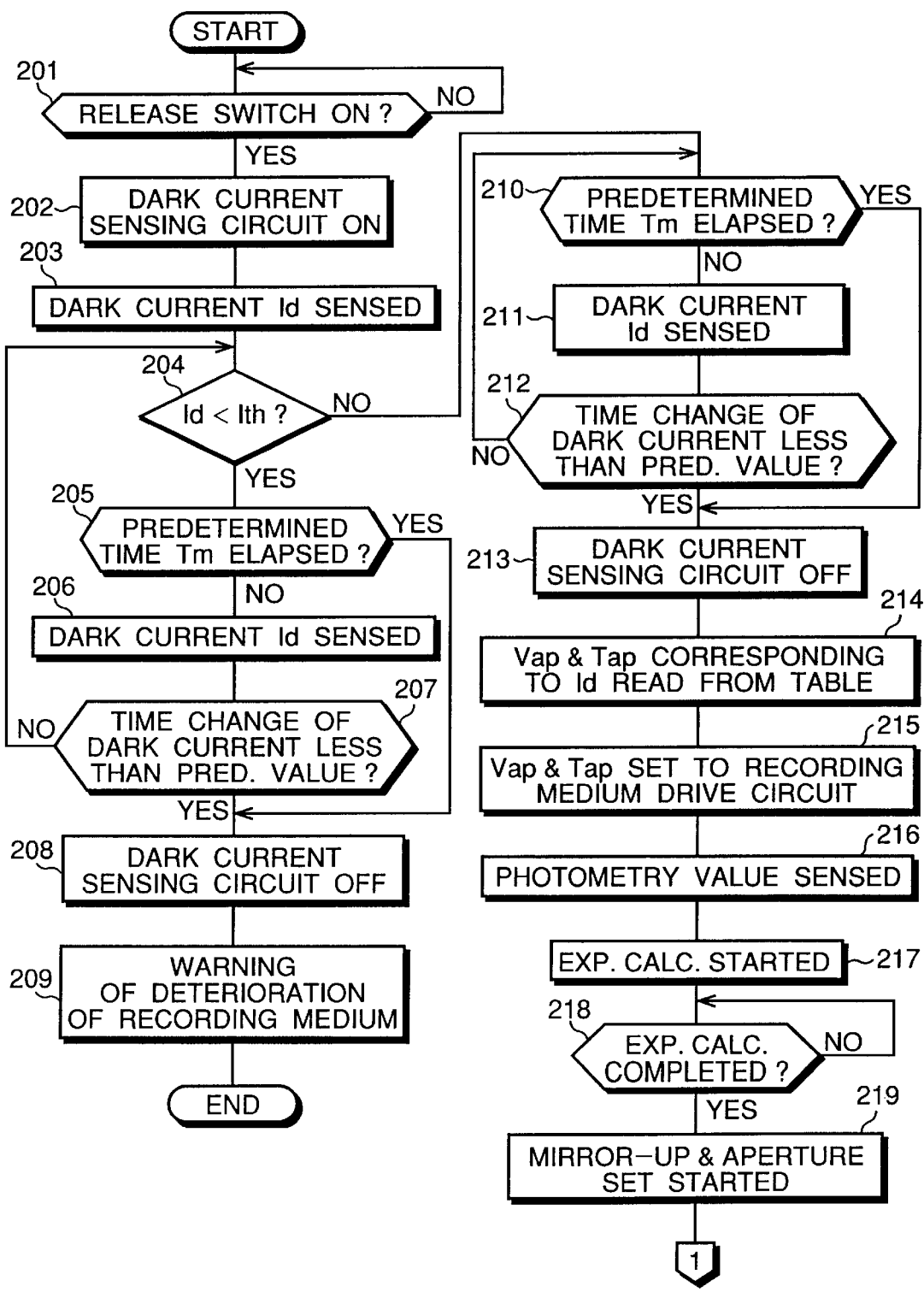
FIG. 15 is a former part of a flow chart of a second example of a program for the recording operation.

FIG. 15 is a flow chart of a second example of a program for a recording operation in which an image is recorded on the electro-developing recording medium 30. The second example can be applied to the dark current sensing circuit 49 shown in FIG. 6.

When it is sensed in Step 201 that the release switch 14 has been depressed, the switch 49b of the dark current sensing circuit 49 is closed in Step 202, so that the dark current sensing circuit 49 is turned ON. In Step 203, the dark current value Id flowing in the electrostatic information recording medium 31 is sensed based on the voltage generated in the dark current sensing resistor 49c.

In Step 204, it is determined whether the dark current Id is greater than the threshold value $I_{th}$. When the dark current Id is greater than the threshold value $I_{th}$, Step 205 is executed, in which it is determined whether a predetermined time Tm has elapsed since the switch 49b was closed, i.e., since a voltage outputted by the power source 49a was applied to the electrostatic information recording medium 31 and the dark current sensing resistor 49c. When the redetermined time Tm has elapsed, it is deemed that the electro-developing recording medium 30 is deteriorated. Then, after the switch 49b is opened in Step 208 so that the dark current sensing circuit 49 is turned OFF, Step 209 is executed, in which a warning indicating that the electro-developing recording medium 30 has deteriorated is displayed by the display 68, and this program ends. Namely, in this case, the recording operation of the electro-developing recording medium 30 is prohibited.

When it is determined in Step 205 that the predetermined time Tm has not elapsed, the dark current Id is sensed in Step 206, and it is determined in Step 207 whether the time change of the dark current is less than a predetermined value. When the time change is less than the predetermined value, the dark current Id would not decline below the threshold value $I_{th}$ as time elapses, and thus, it is deemed that the electro-developing recording medium 30 has deteriorated. Thus, Steps 208 and 209 are executed, and then, this program ends.

Conversely, when it is determined in Step 204 that the 1dark current Id is not greater than the threshold value $I_{th}$, the process goes to Step 210 to perform a recording operation of the electro-developing recording medium 30.

In Step 210, it is determined whether the predetermined time Tm has elapsed since the switch 49b is closed. When the predetermined time Tm has elapsed, switch 49b is opened in Step 213, and then, the process goes to Step 214 to perform the recording operation. The contents of execution of Step 214 and the remaining Steps are the same as those of Steps 111 and the remaining Steps shown in FIG. 13A, and therefore, the explanation thereof is omitted.

When it is determined in Step 210 that the predetermined time Tm has not elapsed since the switch 49b was closed, the dark current Id is sensed in Step 211, and it is determined in Step 212 whether the time change of the dark current Id is less than a predetermined value. When the time change is not less than the predetermined value, Steps 210 through 212 are repeated since the dark current Id has not settled. When it is determined in Step 212 that the time change is less than the predetermined value, it is deemed that the dark current Id has settled and the electro-developing recording medium 30 is normal. Then, after the switch 49b is opened in Step 213, Step 214 and the remaining Steps are executed.

Figure 16:
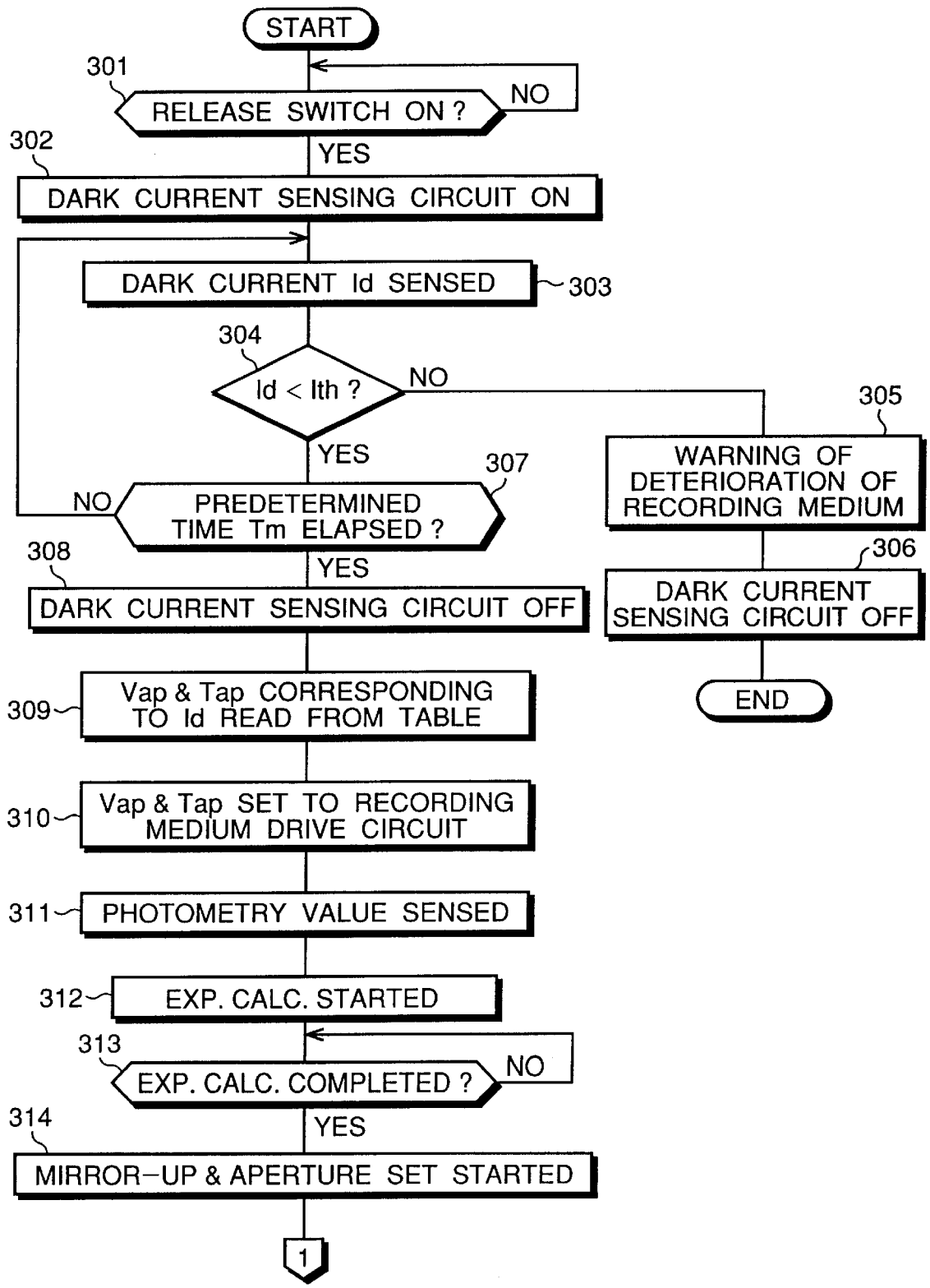
FIG. 16 is a former part of a flow chart of a third example of a program for the recording operation.

FIG. 16 is a flow chart of a third example of a program for a recording operation in which an image is recorded on the electro-developing recording medium 30. The third example can be applied to the dark current sensing circuit 49 shown in FIG. 7.

When it is sensed in Step 301 that the release switch 14 has been depressed, switch 49b is closed in Step 302, so that the dark current sensing circuit 49 is turned ON. In Step 303, the dark current value Id flowing in the electrostatic information recording medium 31 is sensed based on the voltage generated in the dark current sensing resistor 49c. In Step 304, it is determined whether the dark current Id is less than the threshold value $I_{th}$. When the dark current Id is not less than the threshold value $I_{th}$, Step 305 is executed, in which a warning indicating that the electro-developing recording medium 30 has deteriorated is displayed by the display 68. The switch 49b is then opened in Step 306, so that the dark current sensing circuit 49 is turned OFF, and this program ends. Namely, in this case, the recording operation of the electro-developing recording medium 30 is prohibited.

Conversely, when it is determined in Step 304 that the dark current Id is less than the threshold value $I_{th}$, the process goes to Step 307, in which it is determined whether a predetermined time Tm has elapsed since the switch 49b was closed, i.e., since a voltage outputted by the power source 49a is applied to the electrostatic information recording medium 31 and the dark current sensing resistor 49c. This predetermined time Tm is longer than the settling time Ts (see FIG. 12) of the dark current sensing circuit 49. Until the predetermined time Tm has elapsed, Steps 303, 304, and 307 are repeated. Thus, when the dark current Id becomes greater than the threshold value $I_{th}$, the process goes to Step 305. During the execution of Steps 303, 304, and 307, if the predetermined time Tm has elapsed, it is deemed that the electro-developing recording medium 30 is normal, and thus, Step 308 and the remaining Steps are executed.

In Step 308, switch 49b is opened so that the dark current sensing circuit 49 is turned OFF. The contents of execution of Step 309 and the remaining Steps are the same as those of Steps 111 and the remaining Steps shown in FIG. 13A, and therefore, the explanation thereof is omitted.

As described above, according to the embodiment, since the deterioration of the electro-developing recording medium 30 can be precisely determined by sensing the dark current, a recording of an unclear image having a low contrast is recorded. Particularly, according to a construction in which the capacitor 49d is connected to the dark current sensing circuit 49c in parallel, as shown in FIG. 7, the resistance value of the electrostatic information recording medium 31, which corresponds to the deterioration of the electrostatic information recording medium 31, can be sensed approximately at the time when the switch 49c of the dark current sensing circuit 49 is closed. Accordingly, the applied voltage and the voltage application period for obtaining a high contrast image can be set in a moment. Thus, a recording operation can be started immediately after the electro-developing recording medium 30 is set in the camera.

Note that the electro-developing recording medium 30 is not restricted to the constructions shown in FIGS. 3 through 5, but can be any medium in which an image is developed electronically.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-60135 (filed on Feb. 22, 1996) and No. 8-209168 (filed on Jul. 19, 1996) which are expressly incorporated herein, by reference, in their entirety.

I claim:

1. A quality assessment device for an electro-developing recording medium, in which a visible image corresponding to an image formed on an electrostatic information recording medium is electronically developed, said quality assessment device comprising:

a dark current sensing resistor connected in series to said electrostatic information recording medium and a capacitor connected in parallel with said dark current sensing resistor; and a processor that determines whether said electrostatic information recording medium is deteriorated, based on a first electric voltage generated in said dark current sensing resistor.

2. A quality assessment device according to claim 1, wherein said processor senses a resistant value of said electrostatic information recording medium based on said first electric voltage, and determines whether said electrostatic information recording medium is deteriorated based on said resistance value.

3. A quality assessment device according to claim 1, wherein said processor senses a dark current flowing in said electrostatic information recording medium based on said first electric voltage, and determines whether said electrostatic information recording medium has deteriorated based on said dark current.

4. A quality assessment device according to claim 3, further comprising a power source outputting a second electric voltage applied to said electrostatic information recording medium and said dark current sensing resistor.

5. A quality assessment device according to claim 4, wherein said processor determines that said electrostatic information recording medium is deteriorated if said dark current is greater than a threshold value after a predetermined time has elapsed since said second electric voltage is applied to said electrostatic information recording medium and said dark current sensing resistor.

6. A quality assessment device according to claim 4, wherein said processor determines that said electrostatic information recording medium is normal if said dark current is less than a threshold value after a predetermined time has elapsed since said second electric voltage is applied to said electrostatic information recording medium and said dark current sensing resistor.

7. A quality assessment device according to claim 4, wherein said processor determines that said electrostatic information recording medium is deteriorated if a predetermined time has elapsed since said second electric voltage is applied to said electrostatic information recording medium and said dark current sensing resistor, when said dark current is greater than a threshold value.

8. A quality assessment device according to claim 3, wherein said processor determines that said electrostatic information recording medium is deteriorated if a time change of said dark current is less than a predetermined value, when said dark current is greater than a threshold value.

9. A quality assessment device according to claim 4, wherein said processor determines that said electrostatic information recording medium is normal if a predetermined time has elapsed since said second electric voltage is applied to said electrostatic information recording medium and said dark current sensing resistor, when said dark current is less than a threshold value.

10. A quality assessment device according to claim 3, wherein said processor determines that said electrostatic information recording medium is normal if a time change of said dark current is less than a predetermined value, when said dark current is less than a threshold value.

11. A quality assessment device according to claim 3, said processor determining that said electrostatic information recording medium is deteriorated if said dark current is greater than a threshold value.

12. A quality assessment device according to claim 4, said processor determining that said electrostatic information recording medium is normal if a predetermined time has elapsed since said second electric voltage is applied to said electrostatic information recording medium and said dark current sensing resistor.

13. A quality assessment device according to claim 1, further comprising a light that shuts mechanism shutting a light beam entering said electrostatic information recording medium.

14. The quality assessment device according to claim 1, a resistance value of said dark current sensing resistor and a capacitance value of said capacitor being determined such that a time constant of said capacitor and of said resistor is equal to a time constant of said electrostatic information recording medium.

15. A quality assessment device for an electro-developing recording medium in which an image is electronically developed, said quality assessment device comprising:

a dark current sensing resistor connected to said electro-developing recording medium;

a capacitor connected in parallel with said dark current sensing resistor; and a processor that determines whether said electro-developing recording medium is deteriorated, based on an electric voltage generated in said dark current sensing resistor.

16. The quality assessment device according to claim 14, a resistance value of said dark current sensing resistor and a capacitance value of said capacitor being determined such that a time constant of said capacitor and of said resistor is equal to a time constant of an electrostatic information recording medium of the electro-developing recording medium.

* * * * *

UNITED STATES PATENT AND TRADEMARK OFFICE
CERTIFICATE OF CORRECTION

PATENT NO. : 5,974,275
DATED : October 26, 1999
INVENTOR(S) : K. Sato

It is certified that error appears in the above-identified patent and that said Letters Patent is hereby corrected as shown below:

<u>Title page,</u>
At item [73], Assignee, "Asaki Kogaku Kogyo Kabushiki & Dai Nippon Printing Co., Ltd., Tokyo, Japan" should be -- Asahi Kogaku Kogyo Kabushiki Kaisha; Dai Nippon Printing Co., Ltd., both of Tokyo, Japan --.

Signed and Sealed this

Thirtieth Day of October, 2001

Attest:

NICHOLAS P. GODICI
Attesting Officer *Acting Director of the United States Patent and Trademark Office*